United States Patent
Washio et al.

(10) Patent No.: US 9,638,316 B2
(45) Date of Patent: May 2, 2017

(54) CONTROL APPARATUS FOR VEHICULAR AUTOMATIC TRANSMISSION

(71) Applicant: TOYOTA JIDOSHA KABUSHIKI KAISHA, Toyota-shi, Aichi-ken (JP)

(72) Inventors: Taichi Washio, Okazaki (JP); Tsutomu Kawanishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/045,997

(22) Filed: Feb. 17, 2016

(65) Prior Publication Data

US 2016/0245401 A1  Aug. 25, 2016

(30) Foreign Application Priority Data

Feb. 20, 2015  (JP) ................................ 2015-032332

(51) Int. Cl.
  *F16H 61/14* (2006.01)
  *F16H 59/14* (2006.01)
  *F16H 59/18* (2006.01)
  *F16H 59/70* (2006.01)

(52) U.S. Cl.
  CPC .. *F16H 61/143* (2013.01); *B60Y 2300/18066* (2013.01); *B60Y 2300/46* (2013.01); *F16H 2059/145* (2013.01); *F16H 2059/186* (2013.01); *F16H 2059/704* (2013.01)

(58) Field of Classification Search
  CPC ................................................. Y10T 477/735
  See application file for complete search history.

(56) References Cited

U.S. PATENT DOCUMENTS

| | | | | |
|---|---|---|---|---|
| 2001/0049574 A1* | 12/2001 | Taniguchi | ........... | B60W 10/107 701/51 |
| 2004/0014547 A1* | 1/2004 | Habuchi | ............... | F16H 37/027 475/210 |
| 2005/0261111 A1* | 11/2005 | Kurogo | ................. | F16H 61/143 477/169 |
| 2012/0010044 A1* | 1/2012 | Gibson | ............... | B60W 10/023 477/52 |
| 2014/0379232 A1* | 12/2014 | Kobayashi | ............... | B60K 6/48 701/67 |

FOREIGN PATENT DOCUMENTS

| | | |
|---|---|---|
| JP | H11-223263 A | 8/1999 |
| JP | 2004-225879 A | 8/2004 |
| JP | 2010-169174 A | 8/2010 |

* cited by examiner

*Primary Examiner* — Sherry Estremsky
*Assistant Examiner* — Lillian Nguyen
(74) *Attorney, Agent, or Firm* — Oliff PLC (57) ABSTRACT

When an alternator load torque Talt is larger than a threshold α, a lockup clutch is released. Thus, a deceleration G can be restrained from becoming too large due to the alternator load torque Talt. Besides, the threshold α is changed in accordance with a speed ratio γ of a continuously variable transmission. Thus, the deceleration G can be favorably controlled within a predetermined range. For example, in a vehicle state where a deceleration is unlikely to be achieved due to the smallness of the speed ratio γ, the threshold α is large. Therefore, the lockup clutch is unlikely to be released, and the deceleration G is likely to be secured.

3 Claims, 7 Drawing Sheets

CONTROL APPARATUS FOR VEHICULAR AUTOMATIC TRANSMISSION

INCORPORATION BY REFERENCE

The disclosure of Japanese Patent Application No. 2015-032332 filed on Feb. 20, 2015 including the specification, drawings and abstract is incorporated herein by reference in its entirety.

BACKGROUND OF THE INVENTION

1. Field of the Invention

The invention relates to a control apparatus for a vehicular automatic transmission, and more particularly, to the control of an automatic transmission that is configured to be equipped with a torque converter with a lockup clutch and a shifting portion.

2. Description of Related Art

A vehicular automatic transmission that is configured to be equipped with a torque converter with a lockup clutch and a shifting portion is well known. An automatic transmission 6 of Japanese Patent Application Publication No. 2004-225879 (JP 2004-225879 A) is also such an example. In the automatic transmission of Japanese Patent Application Publication No. 2004-225879 (JP 2004-225879 A), it is described that a load of auxiliaries such as an air-conditioner, an alternator and the like is calculated, that a lockup release vehicle speed as a threshold of a vehicle speed for releasing a lockup clutch is calculated in accordance with the load of the auxiliaries, and that the lockup clutch is released based on the calculated lockup release vehicle speed. In concrete terms, the lockup release speed is set in such a manner as to rise in proportion to the load of the auxiliaries. Thus, the deceleration is restrained from becoming too large.

SUMMARY OF THE INVENTION

By the way, the deceleration during deceleration running that is accompanied by the cutoff of fuel supply with the lockup clutch engaged increases as the load of the auxiliaries increases, but changes depending on the speed ratio of the shifting portion as well. That is, even when the load of the auxiliaries remains unchanged, the deceleration changes depending on the speed ratio of the shifting portion. Therefore, it is difficult to favorably control the deceleration.

The invention provides a control apparatus that can favorably control the deceleration at the time of deceleration running accompanied by the cutoff of fuel supply in a vehicular automatic transmission that is configured to be equipped with a torque converter with a lockup clutch and a shifting portion.

According to one aspect of the invention, there is provided a control apparatus for a vehicular automatic transmission. The automatic transmission includes a torque converter with a lockup clutch, and a shifting portion. The control apparatus includes an electronic control unit that is configured to (a) perform engagement control of the lockup clutch during deceleration running accompanied by cutoff of fuel supply to an engine, (b) cancel engagement of the lockup clutch when a load of an auxiliary that is driven through rotation of the engine is equal to or larger than a threshold, and (c) change the threshold such that the threshold increases at least either as a speed ratio of the shifting portion decreases or as a vehicle speed rises.

In this manner, when the load of the auxiliary is larger than the threshold, the lockup clutch is released. Thus, the deceleration can be restrained from becoming too large due to the load of the auxiliary. Besides, in the case where the threshold is set to a value that increases as the speed ratio of the shifting portion decreases, the threshold is large, for example, in a vehicle state where a deceleration is unlikely to be achieved due to the smallness of the speed ratio. Therefore, the lockup clutch is unlikely to be released, and the deceleration is likely to be secured. On the other hand, the threshold is small in a vehicle state where the deceleration is likely to be large due to the largeness of the speed ratio. Therefore, the lockup clutch is likely to be released, and the deceleration can be restrained from becoming too large. Besides, in the case where the threshold is set in such a manner as to increase as the vehicle speed rises, for example, when the vehicle speed is high, the speed ratio of the shifting portion is small, so there is established a vehicle state where a deceleration is unlikely to be achieved. However, when the vehicle speed is high, the threshold is large. Therefore, the lockup clutch is unlikely to be released, and the deceleration is likely to be secured. On the other hand, since the speed ratio of the shifting portion is large when the vehicle speed is low, a deceleration is likely to be achieved. However, since the threshold is small when the vehicle speed is low, the lockup clutch is likely to be released. Thus, the deceleration can be restrained from becoming too large. Besides, even in the case where the threshold is changed based on both the speed ratio of the shifting portion and the vehicle speed, the threshold is changed in the same manner. Thus, the deceleration can be favorably controlled.

In the aforementioned aspect of the invention, the shifting portion may be a continuously variable transmission. Since the shifting portion is a continuously variable transmission, the speed ratio continuously changes. The threshold is also set to an optimal value as needed, in accordance with changes in the speed ratio.

In the aforementioned aspect of the invention, the auxiliary may be an alternator. Thus, it can be determined, based on the load of the alternator, whether or not the engagement of the lockup clutch should be canceled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention will be described hereinafter in detail with reference to the drawings. Incidentally, in the following embodiments of the invention, the drawings are appropriately simplified or transformed, and the dimensional ratios, shapes and the like of respective components are not necessarily depicted with accuracy.

Figure 1:
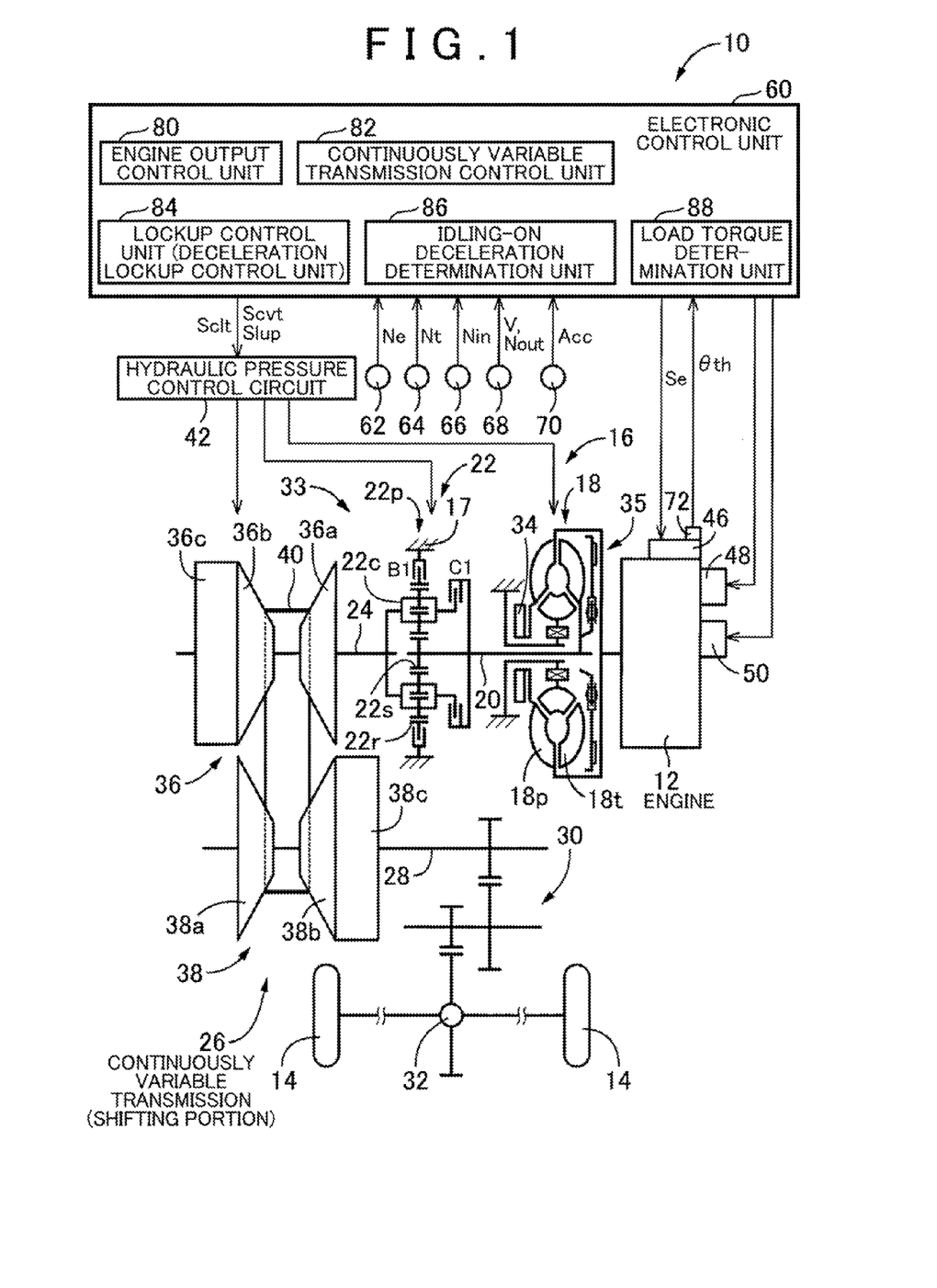
FIG. 1 is a view illustrating the general configuration of a vehicle to which the invention is applied, and is a view illustrating the essence of control functions and control systems for various kinds of control in the vehicle.

FIG. 1 is a view illustrating the general configuration of a vehicle 10 to which the invention is applied, and is a view illustrating the essence of control functions and control systems for various kinds of control in the vehicle 10. In FIG. 1, the vehicle 10 is equipped with an engine 12 as a driving force source for running, driving wheels 14, and a motive power transmission device 16 that is provided between the engine 12 and the driving wheels 14. In a housing 17 as a non-rotary member, the motive power transmission device 16 is equipped with a known torque converter 18 as a hydraulic power transmission that is coupled to the engine 12, a turbine shaft 20 that is coupled to the torque converter 18, a forward/backward changeover device 22 that is coupled to the turbine shaft 20, an input shaft 24 that is coupled to the forward/backward changeover device 22, a continuously variable transmission 26 that is coupled to the input shaft 24, an output shaft 28 that is coupled to the continuously variable transmission 26, a reduction gear device 30, a differential gear device 32, and the like. In the motive power transmission device 16 thus configured, a motive power of the engine 12 (a torque and a driving force are also equivalent in meaning when no distinction is made therefrom in particular) is transmitted to the right and left driving wheels 14 sequentially via the torque converter 18, the forward/backward changeover device 22, the continuously variable transmission 26, the reduction gear device 30, the differential gear device 32 and the like. Besides, a vehicular automatic transmission 33 is configured to be equipped with the torque converter 18 and the continuously variable transmission 26.

The torque converter 18 is equipped with a pump impeller 18p that is coupled to the engine 12, and a turbine impeller 18t that is coupled to the turbine shaft 20. A mechanical oil pump 34 is coupled to the pump impeller 18p. By being rotationally driven by the engine 12, the mechanical oil pump 34 generates a hydraulic oil pressure for performing shifting control of the continuously variable transmission 26, generating a belt clamping force in the continuously variable transmission 26, making a changeover in operation of each of a forward clutch C1 and a backward brake B1, which will be described later, and supplying lubricating oil to respective portions of the motive power transmission device 16. Besides, the torque converter 18 is provided with a lockup clutch 35 that can disconnect/connect the pump impeller 18p and the turbine impeller 18t from/to each other.

The forward/backward changeover device 22 is equipped with a double pinion-type planetary gear device 22p, the forward clutch C1, and the backward brake B1. A sun gear 22s of the planetary gear device 22p is coupled to the turbine shaft 20. A carrier 22c of the planetary gear device 22p is coupled to the input shaft 24. A ring gear 22r of the planetary gear device 22p is selectively coupled to the housing 17 via the backward brake B1. Besides, the carrier 22c and the sun gear 22s are selectively coupled to each other via the forward clutch C1. The forward clutch C1 and the backward brake B1 are known hydraulic frictional engagement devices. In the forward/backward changeover device 22 thus configured, when the forward clutch C1 is engaged and the backward brake B1 is released, a forward motive power transmission path is established (formed). Besides, when the backward brake B1 is engaged and the forward clutch C1 is released, a backward motive power transmission path is established. Besides, when both the forward clutch C1 and the backward brake B1 are released, the forward/backward changeover device 22 assumes a neutral state in which the transmission of a motive power is shut off (a motive power transmission shutoff state).

The continuously variable transmission 26 is equipped with a primary pulley 36 that is provided on the input shaft 24 and that has a variable effective diameter, a secondary pulley 38 that is provided on the output shaft 28 and that has a variable effective diameter, and a transmission belt 40 as a transmission element that is wound between those respective pulleys 36 and 38. The continuously variable transmission 26 transmits a motive power of the engine 12 to the driving wheel 14 sides via a frictional force between those respective pulleys 36 and 38 and the transmission belt 40. Incidentally, the continuously variable transmission 26 corresponds to the shifting portion of the invention.

The primary pulley 36 is equipped with a stationary sheave 36a that is fixed to the input shaft 24, a movable sheave 36b that is provided relatively unrotatably around an axis of the input shaft 24 and movably in an axial direction thereof, and a hydraulic cylinder 36c as a hydraulic actuator that applies a primary thrust force Win (=a primary pressure Pin×a pressure-receiving area Ain) in the primary pulley 36 to change the width of a V-groove between those respective sheaves 36a and 36b. Besides, the secondary pulley 38 is equipped with a stationary sheave 38a that is fixed to the output shaft 28, a movable sheave 38b that is provided relatively unrotatably around an axis of the output shaft 28 and movably in an axial direction thereof, and a hydraulic cylinder 38c as a hydraulic actuator that applies a secondary thrust force Wout (=a secondary pressure Pout×a pressure-receiving area Aout) in the secondary pulley 38 to change the width of a V-groove between those respective sheaves 38a and 38b. The primary pressure Pin is a hydraulic pressure that is supplied to the hydraulic cylinder 36c, and the secondary pressure Pout is a hydraulic pressure that is supplied to the hydraulic cylinder 38c. The respective hydraulic pressures Pin and Pout are pulley hydraulic pressures that apply the thrust forces Win and Wout for pressing the movable sheaves 36b and 38b against the stationary sheave 36a and 38a sides respectively.

In the continuously variable transmission 26, the primary pressure Pin and the secondary pressure Pout are controlled to be regulated by a hydraulic pressure control circuit 42 with which the vehicle 10 is equipped, and the primary thrust force Win and the secondary thrust force Wout are thereby controlled respectively. Thus, the widths of the V-grooves of the respective pulleys 36 and 38 change, and the hanging diameter (the effective diameter) of the transmission belt 40 is changed. A speed ratio (a gear ratio) γ (=an input shaft rotational speed Nin/an output shaft rotational speed Nout) is changed, and the frictional force (i.e., the clamping force, which will be referred to hereinafter as the belt clamping force) between the respective pulleys 36 and 38 and the transmission belt 40 is controlled such that the transmission belt 40 does not slip. That is, each of the primary pressure Pin (which is the same in meaning as the primary thrust force Win) and the secondary pressure Pout (which is the same in meaning as the secondary thrust force Wout) is controlled. Thus, the actual speed ratio γ is made equal to a target speed ratio γtgt while the transmission belt 40 is prevented from slipping.

The hydraulic pressure control circuit 42 is equipped with, for example, a primary regulator valve that regulates a line hydraulic pressure using a hydraulic oil pressure generated by the oil pump 34 as a source pressure, a primary pressure control valve that regulates the primary pressure Pin using the line hydraulic pressure as a source pressure, a secondary pressure control valve that regulates the secondary pressure Pout using the line hydraulic pressure as a source pressure, linear solenoid valves that output control hydraulic pressures for operating those valves respectively, and the like.

The engine 12 is provided with an electronic throttle valve that is controlled to be opened/closed by a throttle actuator, a fuel injection device that controls the amount of fuel injection, an ignition device that controls the timing of ignition, and the like. In the present embodiment of the invention, these components are comprehensively defined as an engine output control device 46. Besides, the engine 12 is provided with an alternator 48 and a compressor 50 for an air-conditioner, which function as auxiliaries that are driven through rotation of the engine 12. The alternator 48 is a generator that is driven through rotation of the engine 12. The electric power generated by the alternator 48 is stored into a battery (not shown). The compressor 50 constitutes an air-conditioning unit. When the compressor 50 is driven, a cooling medium gas that is encapsulated in the air-conditioning unit is sucked and compressed. The cooling medium gas that has reached a high temperature and a high pressure is then discharged to a capacitor (not shown). Both the alternator 48 and the compressor 50 are connected to the engine 12 via a belt (not shown) such that motive power can be transmitted to the engine 12. Besides, as the driving torque (i.e., the load torque) of the alternator 48 and the compressor 50 increases, the load applied to the engine 12 increases, and the engine braking force increases. Incidentally, the alternator 48 and the compressor 50 for the air-conditioner correspond to the auxiliary of the invention.

The vehicle 10 is equipped with an electronic control unit 60 that includes, for example, a control apparatus for the continuously variable transmission 26. The electronic control unit 60 is configured to include, for example, a so-called microcomputer that is equipped with a CPU, a RAM, a ROM, input/output interfaces and the like. The CPU performs various kinds of control of the vehicle 10 by executing a signal process in accordance with a program stored in advance in the ROM while utilizing a temporary storage function of the RAM. For example, the electronic control unit 60 performs output control of the engine 12, belt clamping force control and shifting control of the continuously variable transmission 26, lockup control of the lockup clutch 35 and the like, and is configured separately for engine control, hydraulic pressure control and the like as needed.

Various actual values (e.g., an engine rotational speed Ne, a turbine rotational speed Nt as a rotational speed of the turbine shaft 20, the input shaft rotational speed Nin, the output shaft rotational speed Nout corresponding to a vehicle speed V, an accelerator opening degree Acc as an operation amount of an accelerator pedal, a throttle opening degree θth as an opening angle (or an opening amount) of an electronic throttle valve, and the like) based on detection signals of various sensors (e.g., an engine rotational speed sensor 62, a turbine rotational speed sensor 64, an input shaft rotational speed sensor 66, an output shaft rotational speed sensor 68, an accelerator opening degree sensor 70, a throttle valve opening degree sensor 72 and the like) with which the vehicle 10 is equipped are supplied to the electronic control unit 60.

Besides, various output signals (e.g., an engine output control command signal Se for output control of the engine 12, a hydraulic pressure control command signal Scvt for hydraulic pressure control regarding the shifting of the continuously variable transmission 26, a hydraulic pressure control command signal Slup for hydraulic pressure control regarding lockup control of the lockup clutch 35, a hydraulic pressure control command signal Sclt for hydraulic pressure control regarding engagement operation of the forward clutch C1 and the backward brake B1, and the like) are supplied from the electronic control unit 60 to the respective devices (e.g., the engine 12, the hydraulic pressure control circuit 42 and the like) that are provided in the vehicle 10. The hydraulic pressure control command signal Scvt is, for example, a command signal or the like for driving the respective linear solenoid valves in the hydraulic pressure control circuit 42, which control the primary pressure Pin and the secondary pressure Pout respectively.

The electronic control unit 60 is equipped with engine output control means, namely, an engine output control unit 80, continuously variable transmission control means, namely, a continuously variable transmission control unit 82, lockup control means, namely, a lockup control unit 84.

The engine output control unit 80 calculates a target driving force Ftgt by referring to the actual accelerator opening degree Acc and the actual vehicle speed V in, for example, a driving force map that is obtained experimentally or in a design-based manner and stored in advance (i.e., which is determined in advance). The aforementioned driving force map is a relationship of the target driving force Ftgt that is determined in advance, with the accelerator opening degree Acc and the vehicle speed V used as parameters.

The engine output control unit 80 calculates a target engine torque Tetgt for realizing the target driving force Ftgt. Besides, the engine output control unit 80 calculates a target throttle opening degree θthtgt from which the target engine torque Tetgt is obtained. The engine output control unit 80 calculates the target throttle opening degree θthtgt by referring to the target engine torque Tetgt and the engine rotational speed Ne in, for example, an engine torque map that is determined in advance. The aforementioned engine torque map is a relationship that is determined in advance among the engine torque Te, the engine rotational speed Ne and the throttle opening degree θth. The engine output control unit 80 outputs an engine output control command signal Se for making the throttle opening degree θth equal to the target throttle opening degree θthtgt to a throttle actuator that constitutes an engine output control device 46. In addition, the engine output control unit 80 outputs engine output control command signals Se such as an injection signal, an ignition timing signal and the like to a fuel injection device and an ignition device, which constitute the engine output control device 46, respectively, such that the target engine torque Tetgt is obtained.

Figure 2:
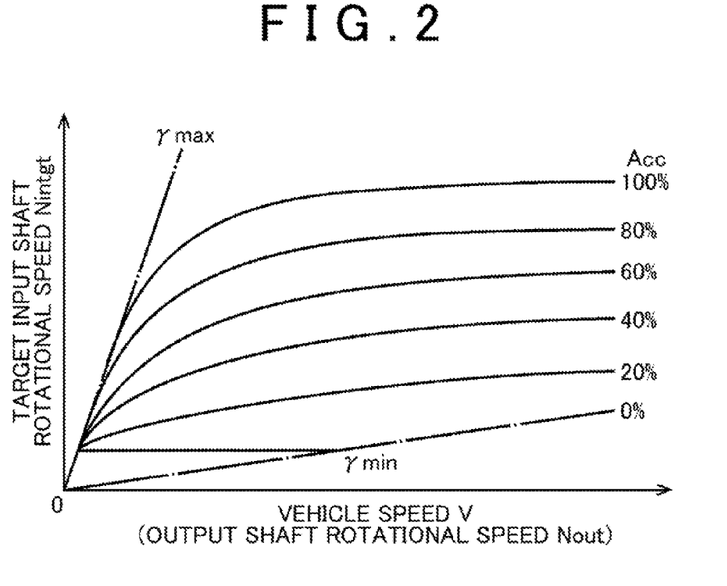
FIG. 2 is a shifting map of a continuously variable transmission of FIG. 1.

The continuously variable transmission control unit 82 calculates a target speed ratio γtgt of the continuously variable transmission 26 based on the accelerator opening degree Acc. The continuously variable transmission control unit 82 calculates a target input shaft rotational speed Nintgt by referring to the actual vehicle speed V and the actual accelerator opening degree Acc in, for example, a shifting map that is determined in advance as shown in FIG. 2. The continuously variable transmission control unit 82 calculates the target speed ratio γtgt (=Nintgt/Nout) based on the target input shaft rotational speed Nintgt. The aforementioned shifting map is a relationship that is determined in advance between the vehicle speed V (the output shaft rotational speed Nout) and the target input shaft rotational speed Nintgt with the accelerator opening degree Acc used as a parameter. The aforementioned shifting map is equivalent to a shifting condition for making operability (dynamic performance) and fuel economy (fuel-saving performance) compatible with each other.

The continuously variable transmission control unit 82 determines a target value of the primary pressure Pin (hereinafter referred to as a target primary pressure Pintgt) and a target value of the secondary pressure Pout (hereinafter referred to as a target secondary pressure Pouttgt), for example, in such a manner as to achieve the target speed ratio γtgt of the continuously variable transmission 26 while preventing the belt of the continuously variable transmission 26 from slipping, and outputs hydraulic pressure control command signals Scvt, which correspond to the target primary pressure Pintgt and the target secondary pressure Pouttgt respectively, to the hydraulic pressure control circuit 42.

Figure 3:
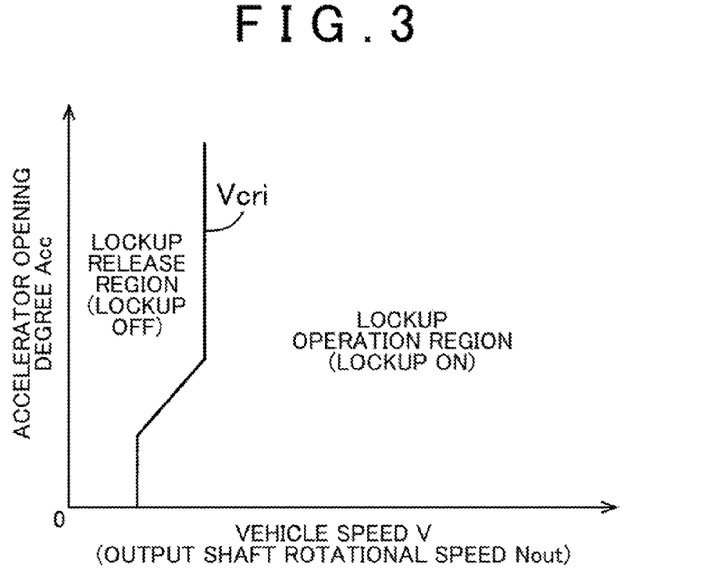
FIG. 3 is an operation region map of a lockup clutch that is constituted of accelerator opening degree and vehicle speed.

The lockup control unit 84 makes a determination on an optimal operation state of the lockup clutch 35 by referring to the actual accelerator opening degree Acc and the actual vehicle speed V in, for example, an operation region map of the lockup clutch 35, which is determined in advance as shown in FIG. 3 and is constituted of the accelerator opening degree Acc and the vehicle speed V. The lockup control unit 84 controls the operation state of the lockup clutch 35 by outputting the hydraulic pressure control command signal Slup to the hydraulic pressure control circuit 42, such that an engagement state that is determined based on the operation region map is achieved. As indicated by the operation region map of FIG. 3, the lockup clutch 35 is set in such a manner as to be released (lockup off) in a low vehicle speed range, and to be engaged (lockup on) in an intermediate vehicle speed range and a high vehicle speed range. In this manner, the lockup operation region (the engagement region) of the lockup clutch 35 is set to the low vehicle speed range. Thus, fuel economy is improved. Besides, in a region where the accelerator opening degree Acc is close to zero, a lockup release vehicle speed Vcri for making a determination on a changeover of the lockup clutch 35 is set further toward the low vehicle speed side. That is, the lockup operation region of the lockup clutch 35 is enlarged.

By the way, during deceleration running with the running state of the vehicle being in the lockup operation region and with depression of the acceleration pedal canceled, the engine output control unit 80 improves fuel economy by performing fuel cutoff control for stopping the supply of fuel from the fuel injection device.

During deceleration running accompanied by fuel cutoff control in this lockup operation region (hereinafter referred to simply as deceleration running), the deceleration G of the vehicle 10 changes depending on the load torques of the alternator 48 and the compressor 50 for the air-conditioner (driving torques for driving the alternator 48 and the compressor 50). Besides, the deceleration G of the vehicle 10 changes depending on the speed ratio γ of the continuously variable transmission 26 during deceleration running as well. For example, the deceleration G of the vehicle 10 increases as the load torque increases, and the deceleration G of the vehicle increases as the speed ratio γ of the continuously variable transmission 26 increases. Accordingly, the deceleration G may be too large in a certain running state, or it may be impossible to secure the desired deceleration G in some cases. The deceleration G of the vehicle 10 needs to be confined within a predetermined deceleration range, but it is difficult to favorably control the deceleration G under the present circumstances.

In contrast, the lockup control unit 84 is functionally equipped with a deceleration lockup control unit that favorably controls the deceleration G by performing engagement control of the lockup clutch 35 in accordance with the speed ratio γ of the continuously variable transmission 26 in addition to the load torques of the alternator 48 and the compressor 50. The control during deceleration running accompanied by fuel cutoff control in the lockup operation region will be described hereinafter. Incidentally, the load torque applied to the engine 12 is a summated value of the load torques of the alternator 48 and the compressor 50 for the air-conditioner. However, for the sake of simplified explanation, the load torque of the alternator 48 (an alternator load torque Talt) will be described in the following description. Incidentally, it is assumed that the forward clutch C1 is engaged during the deceleration running.

Returning to FIG. 1, an idling-on deceleration determination unit 86 (idling-on deceleration determination means) determines whether or not the running state of the vehicle 10 is in the lockup operation region (lockup on), whether or not the vehicle is in the process of so-called idling-on deceleration running, namely, deceleration running with the accelerator pedal not depressed, and whether or not the cutoff of fuel supply is being executed (fuel cutoff control is being performed). It is determined whether or not the running state is in the lockup operation region, based on, for example, whether or not the current running state is in the lockup operation region in the operation region map of the lockup clutch 35 in FIG. 3, or the hydraulic pressure control command signal Slup that is output from the electronic control unit 60. Besides, it is determined whether or not the vehicle is in the process of idling-on deceleration, based on whether or not the accelerator opening degree Acc is zero and the vehicle speed V is on the decrease. Besides, it is determined whether or not the cutoff of fuel supply is being executed, based on, for example, whether or not the accelerator opening degree Acc is zero and the engine rotational speed Ne is equal to or higher than a fuel cutoff recovery rotational speed that is set in advance, or a fuel cutoff execution flag or the like that is output from the electronic control unit 60. In a running state where the results of all these determinations are affirmative, lockup-on control of the lockup clutch 35 is performed by the lockup control unit 84, and fuel cutoff control is performed by the engine output control unit 80.

The load torque determination unit 88 (load torque determination means) determines whether or not the alternator load torque Talt of the alternator 48 is equal to or larger than a threshold α that is set in advance. This threshold α is a criterion value for determining whether or not the lockup clutch 35 should be released during deceleration running. In concrete terms, when the alternator load torque Talt is equal to or larger than the threshold α, it is determined that the lockup clutch 35 should be released. When the alternator load torque Talt increases, the deceleration G to be achieved is likely to be large due to an increase in engine braking force. In such a case, the lockup clutch 35 is released to make a recovery from fuel cutoff control. Thus, the deceleration G can be confined within a predetermined range. The threshold α is obtained in advance experimentally, and is set to such a value that the deceleration G during deceleration running does not exceed the predetermined range. Besides, the alternator load torque Talt of the alternator 48 is set based on the capacity (the remaining power) of the battery that is charged with an electric power generated by the alternator 48 or the charging control state of the battery. When it is determined that the alternator load torque Talt is equal to or larger than the threshold α, the load torque determination unit 88 turns on a lockup release request flag for making a determination on the release of the lockup clutch 35. Incidentally, the alternator load torque Talt corresponds to the load of the auxiliary of the invention.

Figure 4:
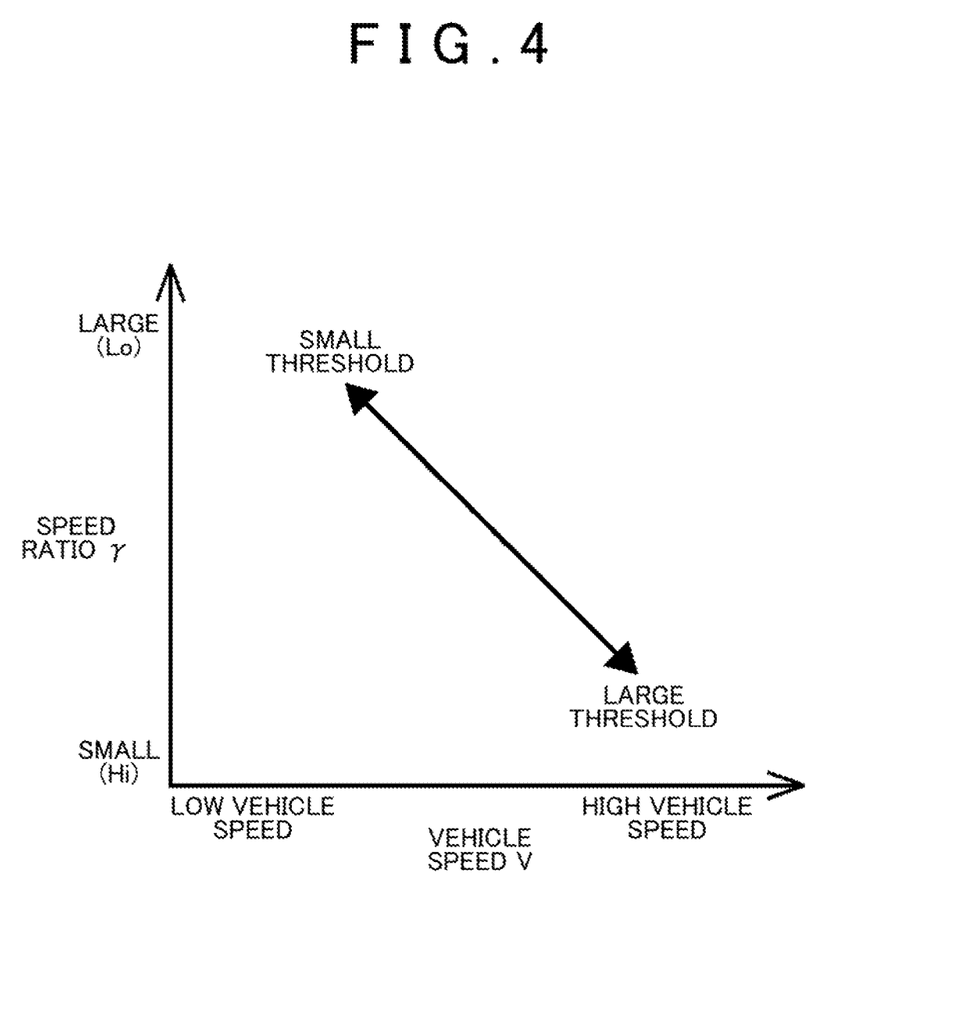
FIG. 4 is a map for obtaining a threshold for making a determination on the release of the lockup clutch.

Besides, during deceleration running, shifting control of the continuously variable transmission 26 is performed by the continuously variable transmission control unit 82, and the speed ratio γ changes in such a manner as to increase as the vehicle decelerates. Accordingly, the speed ratio γ is large during deceleration running, so the deceleration G to be achieved is likely to be large. In consideration of this, according to the present embodiment of the invention, the threshold α is changed in accordance with the speed ratio γ of the continuously variable transmission 26 and the vehicle speed V. FIG. 4 is an exemplary map for obtaining the threshold α. The map of FIG. 4 is configured as a two-dimensional map of the vehicle speed V and the speed ratio γ of the continuously variable transmission 26. As shown in FIG. 4, the threshold α is set to a value that increases as the speed ratio γ decreases, and the threshold α is set to a value that increases as the vehicle speed V rises.

The engine rotational speed Ne falls as the speed ratio γ decreases. Therefore, the engine load torque decreases, and there is established a vehicle state where the deceleration G is unlikely to be achieved. In such a vehicle state, the threshold α is set to a large value. Thus, the lockup clutch 35 is unlikely to be released, and the deceleration G is likely to be secured. On the other hand, the engine load torque increases as the speed ratio γ increases, so the deceleration G to be achieved is likely to be large. In a vehicle state in such a case, the threshold α is set to a small value. Thus, the lockup clutch 35 is likely to be released. Accordingly, fuel cutoff control ends (a recovery from fuel cutoff control is made) as soon as the lockup clutch 35 is released. Thus, the deceleration G is also restrained from exceeding the predetermined range.

Besides, when the vehicle speed V rises, the speed ratio γ of the continuously variable transmission 26 also decreases, and the engine load torque decreases. Therefore, there is established a vehicle state where the deceleration G is unlikely to be achieved. In such a vehicle state, the threshold α is set to a large value. Thus, the lockup clutch 35 is unlikely to be released, and the deceleration G is likely to be secured. On the other hand, when the vehicle speed V falls, the speed ratio γ of the continuously variable transmission 26 also increases, and the engine load torque also increases. Therefore, the deceleration G to be achieved is likely to be large. In such a vehicle state, the threshold α is set to a small value. Thus, the lockup clutch 35 is likely to be released. Accordingly, fuel cutoff control ends as soon as the lockup clutch 35 is released. Thus, the deceleration G is also restrained from exceeding the predetermined range.

When it is determined based on the load torque determination unit 88 that the alternator load torque Talt is equal to or larger than the threshold α (it is determined that the lockup release request flag is on), the lockup control unit 84 performs release control of the lockup clutch 35. That is, when the load torque Talt is equal to or larger than the threshold α, the engagement of the lockup clutch 35 is cancelled. Besides, when the engine rotational speed Ne reaches the fuel cutoff recovery rotational speed that is set in advance after falling as the lockup clutch 35 is released, the fuel cutoff execution flag for making a determination on the performance of fuel cutoff control is turned off. With a view to preventing the engine 12 from being stopped, the engine output control unit 80 stops fuel cutoff control, resumes the supply of fuel and controls the engine 12 to an idling rotational state. As described above, a determination on the release of the lockup clutch 35 is made based on the threshold α. Thus, the deceleration G can be confined within the predetermined range.

Figure 5:
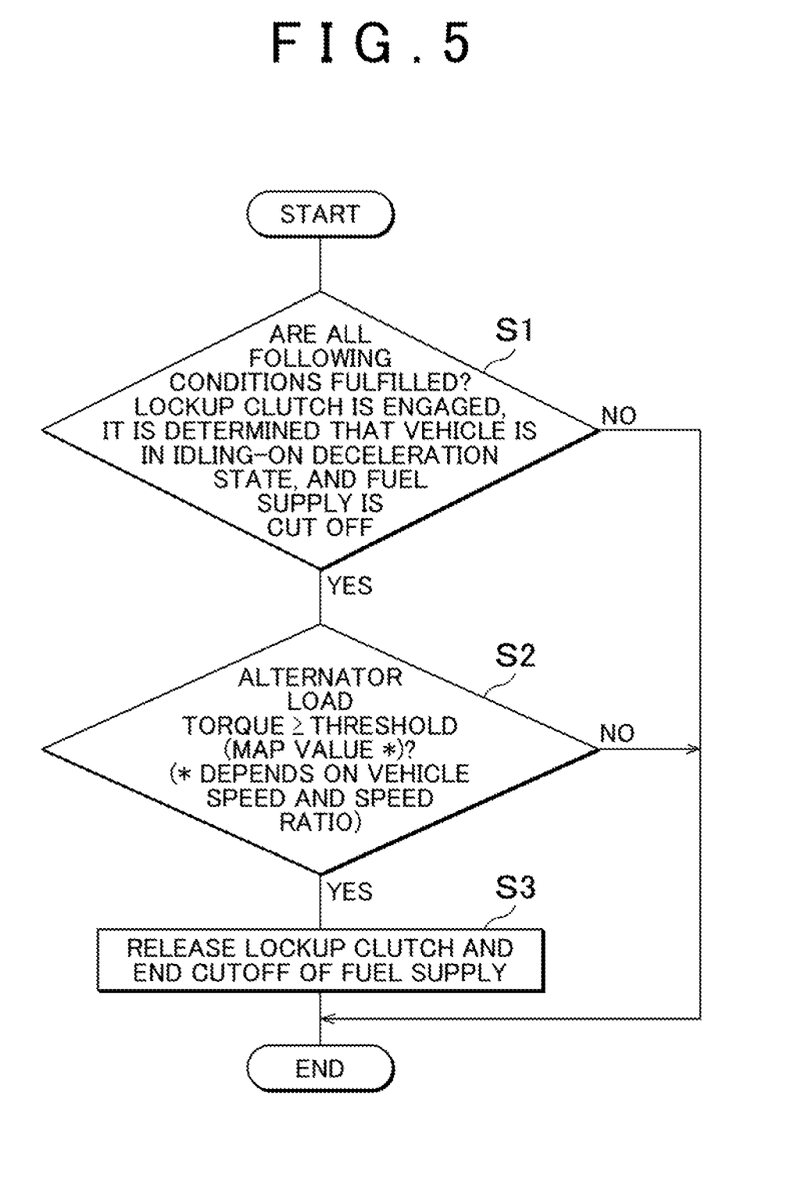
FIG. 5 is a flowchart illustrating the essence of the control operation of an electronic control unit of FIG. 1, namely, the control operation capable of confining a deceleration generated during deceleration running within a predetermined range.

FIG. 5 is a flowchart illustrating the essence of the control operation of the electronic control unit 60, namely, the control operation capable of favorably controlling the deceleration G generated during deceleration running within the predetermined range. The routine of this flowchart is repeatedly executed during running.

First of all, in step S1 (the word "step" will be omitted hereinafter) corresponding to the idling-on deceleration determination unit 86, it is determined whether or not the lockup clutch 35 is engaged, whether or not the vehicle is in a deceleration running (idling-on running) state with depression of the accelerator pedal canceled, and whether or not fuel cutoff control is being executed. If even one of the results of these determinations is negative, the present routine is ended. If the results of these determinations are all affirmative, a transition to S2 is made.

In S2 corresponding to the load torque determination unit 88, it is determined whether or not the alternator load torque Talt is equal to or larger than the threshold α that is set in advance. Incidentally, the threshold α is changed as needed based on the two-dimensional map that is constituted of the vehicle speed V and the speed ratio γ as shown in FIG. 4. If the alternator load torque Talt is smaller than the threshold α, the result of this determination is negative, and the present routine is ended. That is, the lockup clutch 35 is held engaged. On the other hand, if the alternator load torque Talt is equal to or larger than the threshold α, the result of this determination is affirmative, and a transition to S3 is made. In S3 corresponding to the lockup control unit 84 (the deceleration lockup control unit) and the engine output control unit 80, the lockup clutch 35 is released. Besides, when the engine rotational speed Ne falls and reaches the fuel cutoff recovery rotational speed that is set in advance due to the release of the lockup clutch 35, fuel cutoff control ends, and the engine 12 is controlled to an idling rotation state. In this state, when the alternator load torque Talt becomes equal to or larger than the threshold α, the lockup clutch 35 is released. Thus, the deceleration G is held within the predetermined range.

Figure 6:
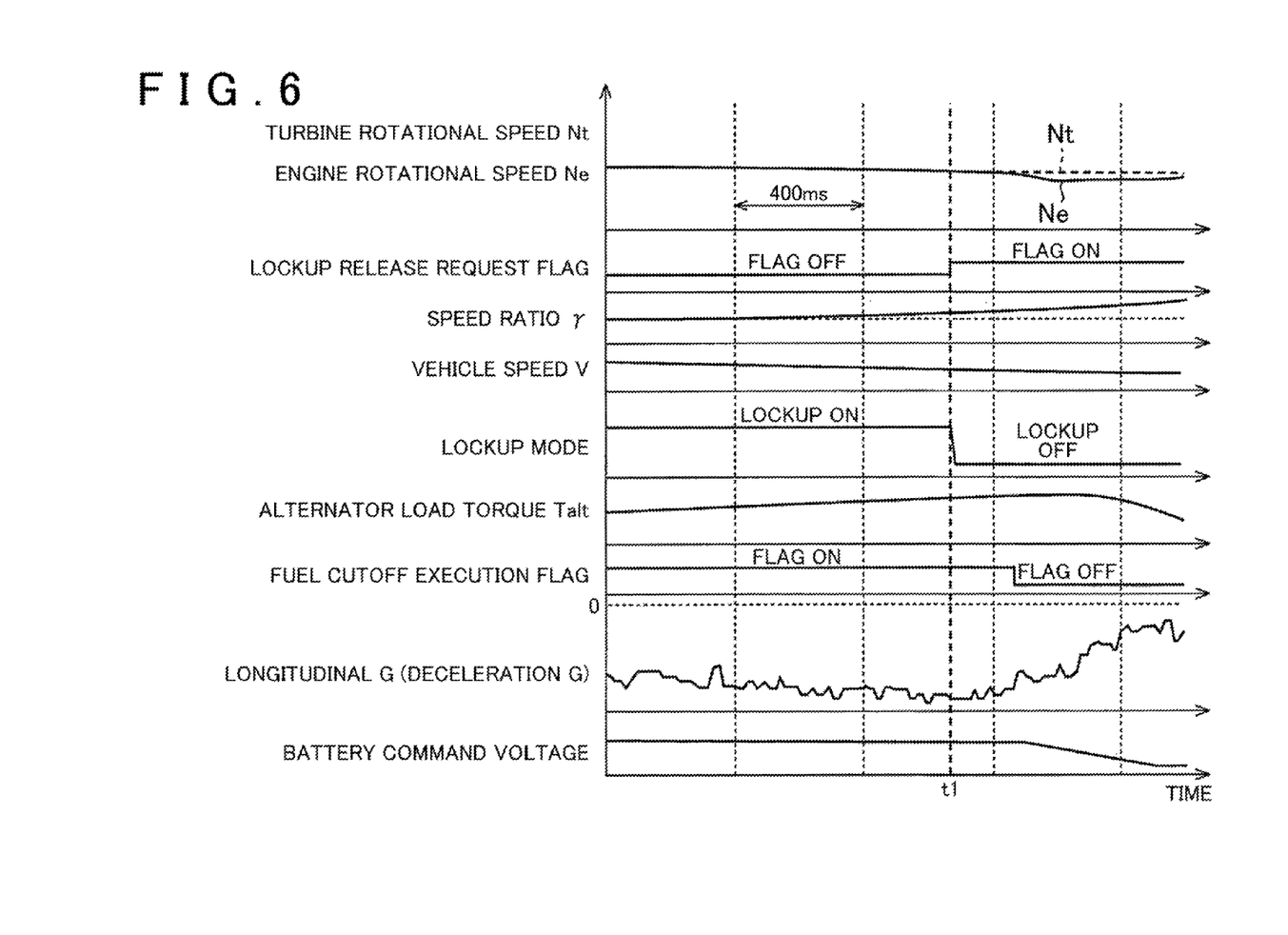
FIG. 6 is a time chart showing an operation result obtained by the control operation of the electronic control unit of FIG. 1.

FIG. 6 is a time chart showing an operation result obtained by the control operation of the electronic control unit 60. The axis of abscissa represents elapsed time, and the axis of ordinate represents, sequentially from above, the turbine rotational speed Nt, the engine rotational speed Ne, the lockup release request flag, the speed ratio γ of the continuously variable transmission 26, the vehicle speed V, a lockup mode, the alternator load torque Talt, the fuel cutoff execution flag, the longitudinal G (i.e., the deceleration G), and a battery command voltage.

At and before a time point t1 shown in FIG. 6, the vehicle decelerates with the lockup release request flag off, namely, with the lockup mode being lockup on and with the fuel cutoff execution flag on. That is, during deceleration running in the operation region of the lockup clutch 35, the supply of fuel is cut off by canceling the depression of the accelerator pedal. Besides, electric power generation control is performed by the alternator 48 during deceleration running, and the alternator load torque Talt that is determined based on the battery capacity or the like is applied. In FIG. 6, the alternator load torque Talt increases with the lapse of time. Besides, the speed ratio γ of the continuously variable transmission 26 gradually increases as the vehicle speed V falls. In connection with such an increase in the alternator load torque Talt and such an increase in the speed ratio γ, the deceleration G of the vehicle tends to increase until the time point t1.

At and before this time point t1, the control shown in the flowchart of FIG. 5 is repeatedly performed, and it is repeatedly determined whether or not the alternator load torque Tat is equal to or larger than the threshold α. Incidentally, the threshold α is changed as needed in accordance with the speed ratio γ and the vehicle speed V as described above. Then, when it is determined at the time point t11 that the alternator load torque Talt is equal to or larger than the threshold α, the lockup release request flag is turned on, and the lockup mode shifts to the mode of lockup-off. Thus, the lockup clutch 35 is released. Besides, when the lockup clutch 35 is released, the engine rotational speed Ne falls to the fuel cutoff recovery rotational speed that is set in advance, so the fuel cutoff execution flag is turned off, and the supply of fuel is resumed. Thus, the engine rotational speed Ne that has fallen due to the release of the lockup clutch 35 is controlled to the idling rotational speed that is set in advance.

Besides, the engine load torque and the alternator load torque Talt are not applied due to the release of the lockup clutch 35. Therefore, at and after the time point t1, the deceleration G changes toward zero. In this manner, the deceleration G is restrained from exceeding the predetermined range.

As described above, according to the present embodiment of the invention, when the alternator load torque Talt is larger than the threshold α, the lockup clutch 35 is released. Thus, the deceleration G can be restrained from becoming too large due to the alternator load torque Talt. Besides, the threshold α is set to a value that increases as the speed ratio γ of the continuously variable transmission 26 decreases. Thus, the threshold α is large, for example, in a vehicle state where a deceleration is unlikely to be achieved due to the smallness of the speed ratio γ. Therefore, the lockup clutch 35 is unlikely to be released, and the deceleration G is likely to be secured. On the other hand, the threshold α is small in a vehicle state where the deceleration G is likely to be large due to the largeness of the speed ratio γ. Therefore, the lockup clutch 35 is likely to be released, and the deceleration G can be restrained from becoming too large.

Besides, according to the present embodiment of the invention, when the vehicle speed V is high, the speed ratio γ of the continuously variable transmission 26 is small. Therefore, there is established a vehicle state where the deceleration G is unlikely to be achieved. In contrast, when the vehicle speed V is high, the threshold α is large. Therefore, the lockup clutch 35 is unlikely to be released, and the deceleration G is likely to be secured. Besides, when the vehicle speed V is low, the speed ratio γ of the continuously variable transmission 26 is large. Therefore, the deceleration G to be achieved is likely to be large. In contrast, when the vehicle speed V is low, the threshold α is small. Therefore, the lockup clutch 35 is likely to be released, and the deceleration G can be restrained from becoming too large.

Next, another embodiment of the invention will be described.

Incidentally, in the following description, the components common to those of the foregoing embodiment of the invention are denoted by the same reference symbols respectively, and the description thereof will be omitted.

In the foregoing embodiment of the invention, a determination on the release of the lockup clutch 35 is made based on whether or not the alternator load torque Talt is equal to or larger than the threshold α, and this threshold α is changed based on the vehicle speed V and the speed ratio γ of the continuously variable transmission 26. In the present embodiment of the invention, the lockup release vehicle speed Vcri (hereinafter described as the release vehicle speed Vcri), which is a boundary vehicle speed between the lockup operation region (lockup on) and the lockup release region (lockup off) shown in FIGS. 7 and 8, is determined based on the alternator load torque Talt and the speed ratio γ.

Figure 7:
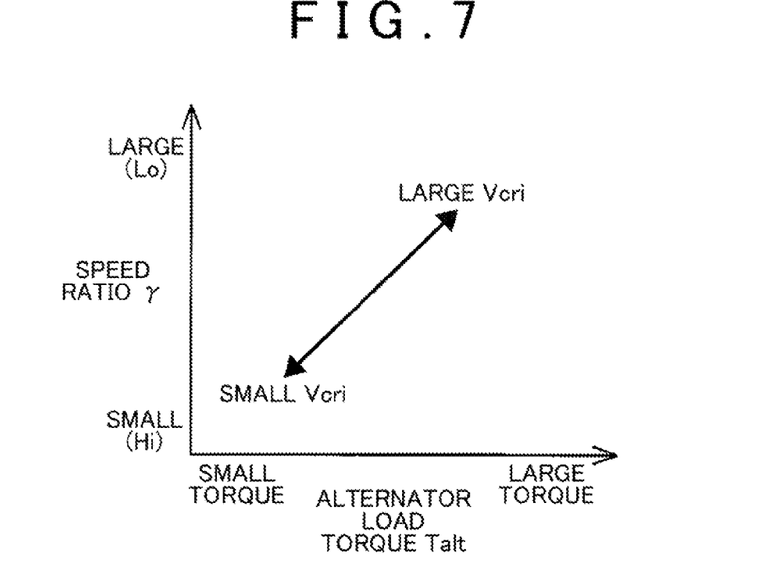
FIG. 7 is an exemplary map for obtaining a lockup release vehicle speed for making a determination on the release of a lockup clutch according to another embodiment of the invention.
Figure 8:
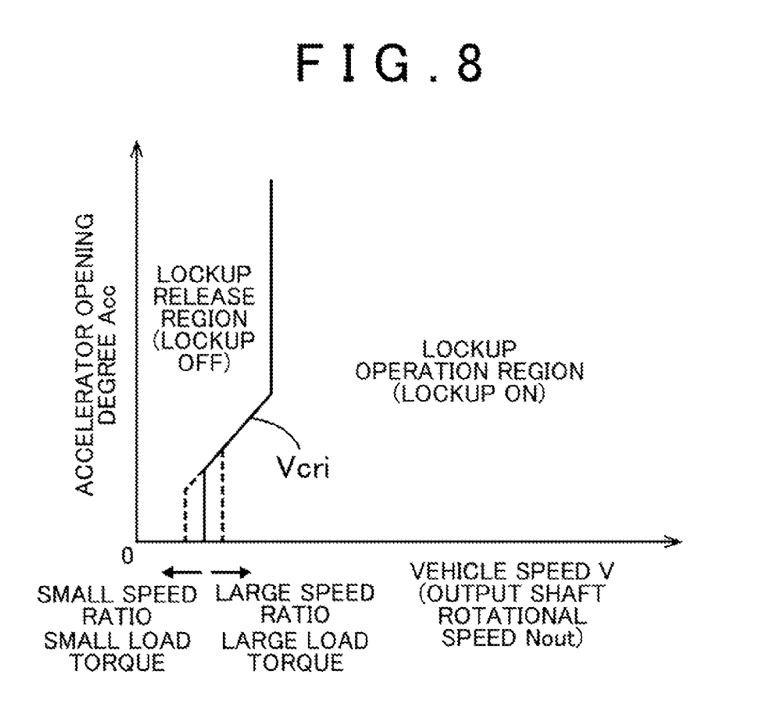
FIG. 8 is an operation region map of the lockup clutch based on the map of FIG. 7.

FIG. 7 is an exemplary map for obtaining the release vehicle speed Vcri for making a determination on the release of the lockup clutch 35. The map of FIG. 7 is configured as a two-dimensional map of the speed ratio γ of the continuously variable transmission 26 and the alternator load torque Talt of the alternator. As shown in FIG. 7, the release vehicle speed Vcri rises as the speed ratio γ increases, and the release vehicle speed Vcri rises as the alternator load torque Talt increases.

The likelihood of the deceleration G to be achieved being large increases as the speed ratio γ increases. In such a vehicle state, the release vehicle speed Vcri is set high. Thus, the timing when the lockup clutch 35 is released is advanced. Therefore, the deceleration G is restrained from increasing. On the other hand, there is established a vehicle state where the likelihood of the deceleration G being achieved decreases as the speed ratio decreases. In such a vehicle state, the release vehicle speed Vcri is set low. Thus, the timing when the lockup clutch 35 is released is retarded. Therefore, the deceleration G is likely to be secured.

Besides, the likelihood of the deceleration G to be achieved being large increases as the alternator load torque Talt increases. In such a vehicle state, the release vehicle speed Vcri is set to a high value. Thus, the timing when the lockup clutch 35 is released is advanced. Therefore, the deceleration G is restrained from increasing. On the other hand, there is established a vehicle state where the likelihood of the deceleration G being achieved decreases as the alternator load torque Talt decreases. In such a vehicle state, the release vehicle speed Vcri is set to a low value. Thus, the timing when the lockup clutch 35 is released is retarded. Therefore, the deceleration G is likely to be secured.

When the release vehicle speed Vcri is determined based on the map of FIG. 7, a determination on the timing for releasing the lockup clutch 35 is made based on the determined release vehicle speed Veri. Referring to the operation region map of the lockup clutch 35 of FIG. 8, the release vehicle speed Vcri changes in accordance with the speed ratio γ of the continuously variable transmission 26 and the alternator load torque Talt as indicated by broken lines in FIG. 8. That is, when the speed ratio γ and the alternator load torque Talt increase, the release vehicle speed Vcri is set on the high vehicle speed side. When the speed ratio γ and the alternator load torque Talt decrease, the release vehicle speed Vcri is set on the low vehicle speed side.

The lockup control unit 84 makes a determination on the timing for releasing the lockup clutch 35 in accordance with the release vehicle speed Vcri that is determined based on the speed ratio γ and the alternator load torque Talt, and releases the lockup clutch 35. As described above, the timing when the lockup clutch 35 is released is optimized by changing the release vehicle speed Vcri in accordance with the speed ratio γ and the alternator load torque Talt as well. As a result, the deceleration G is controlled within the predetermined range.

As described above, in the present embodiment of the invention as well, the release vehicle speed Vcri is set based on the speed ratio γ and the alternator load torque Talt. Thus, the deceleration G of the vehicle 10 can be controlled within the predetermined range.

In the foregoing embodiment of the invention, the threshold α of the alternator load torque Talt for making a determination on the release of the lockup clutch 35 is changed based on both the speed ratio γ of the continuously variable transmission 26 and the vehicle speed V. However, the threshold α may be set based on one of the speed ratio γ and the vehicle speed V.

Figure 9:
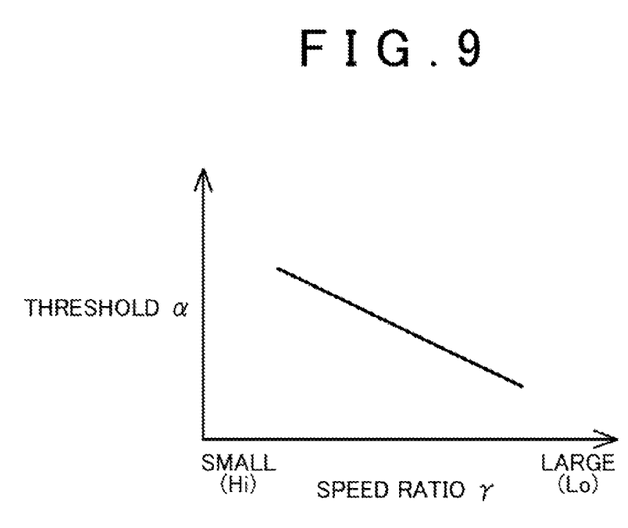
FIG. 9 is a relational map showing a relationship between threshold and speed ratio according to still another embodiment of the invention.

FIG. 9 is a relational map between the speed ratio γ and the threshold α, which is applied in the case where the threshold α is changed based on the speed ratio γ. As shown in FIG. 9, the threshold α is set to a value that increases as the speed ratio γ of the continuously variable transmission 26 decreases. When the speed ratio γ decreases, there is established a state where the deceleration G is unlikely to be achieved. In such a case, the threshold α is set to a large value. Thus, the lockup clutch 35 is unlikely to be released, and the deceleration G is likely to be secured. On the other hand, when the speed ratio γ increases, the deceleration G to be achieved is likely to be large. In such a case, the threshold α is set to a small value. Thus, the lockup clutch 35 is likely to be released, and the deceleration G to be achieved is restrained from becoming too large. Accordingly, the deceleration G is favorably controlled by appropriately changing the threshold α based on this relational map of FIG. 9.

Figure 10:
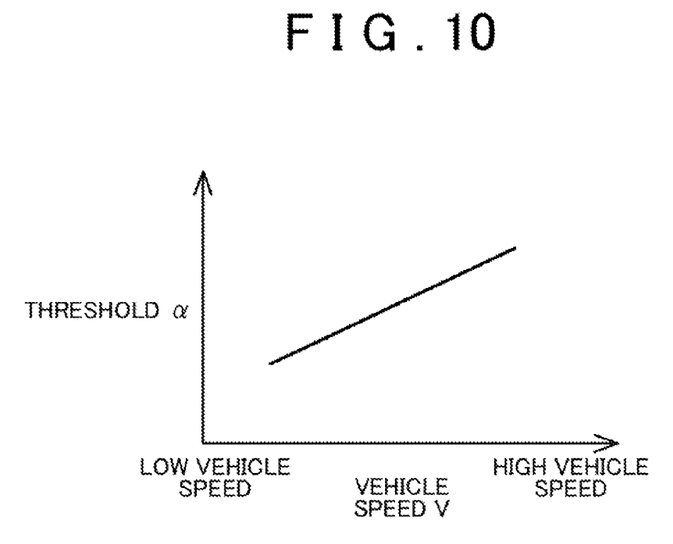
FIG. 10 is a relational map showing a relationship between threshold and vehicle speed according to still another embodiment of the invention.

FIG. 10 is a relational map between the vehicle speed V and the threshold α, which is applied in the case where the threshold α is changed based on the vehicle speed V. As shown in FIG. 10, the threshold α is set to a value that increases as the vehicle speed V rises. When the vehicle speed V rises, the speed ratio γ of the continuously variable transmission 26 decreases, so the deceleration G is unlikely to be achieved. In such a case, the threshold α is set to a large value. Thus, the lockup clutch 35 is unlikely to be released, and the deceleration G is likely to be secured. On the other hand, when the vehicle speed V falls, the speed ratio γ increases, so the deceleration G to be achieved is likely to be large. In such a case, the threshold α is set to a small value. Thus, the lockup clutch 35 is likely to be released, and the deceleration G to be achieved is restrained from becoming too large. Accordingly, the deceleration G is favorably controlled by appropriately changing the threshold α based on this relational map of FIG. 10.

As described above, even in the case where the threshold α of the load torque Talt for making a determination on the release of the lockup clutch 35 is set based on one of the speed ratio γ and the vehicle speed V, an effect similar to that of the foregoing embodiment of the invention can be obtained.

Although the embodiments of the invention have been described hereinabove in detail based on the drawings, the invention is also applied to other aspects thereof.

For example, in the foregoing embodiments of the invention, the alternator load torque Talt of the alternator 48 has been described as an example of the load torque of the auxiliary. However, the load torque resulting from the compressor 50 for the air-conditioner can also be reflected by the threshold.

Besides, in the foregoing embodiments of the invention, the threshold α is determined based on the vehicle speed V and the speed ratio γ of the continuously variable transmission 26. However, the threshold α may be determined based on one of the vehicle speed V and the speed ratio γ of the continuously variable transmission 26.

Besides, in the foregoing embodiments of the invention, the transmission that is provided at a posterior stage of the torque converter 18 is the belt-type continuously variable transmission 26. However, the invention is not limited to the belt-type continuously variable transmission, but is also applicable to, for example, a toroidal-type continuously variable transmission or a stepped transmission.

Incidentally, the foregoing is nothing more than the embodiments of the invention. The invention can be carried out in an aspect that is subjected to various modifications and improvements based on the knowledge of those skilled in the art.

What is claimed is:

1. A control apparatus for a vehicular automatic transmission, the automatic transmission including a torque converter with a lockup clutch and a shifting portion, the control apparatus comprising:
   an electronic control unit configured to
   (a) perform engagement control of the lockup clutch during deceleration running accompanied by cutoff of fuel supply to an engine,
   (b) cancel engagement of the lockup clutch when a load of an auxiliary that is driven through rotation of the engine is equal to or larger than a threshold, and
   (c) change the threshold such that the threshold increases at least either as a speed ratio of the shifting portion decreases or as a vehicle speed rises.

2. The control apparatus according to claim 1, wherein the shifting portion is a continuously variable transmission.

3. The control apparatus according to claim 1, wherein the auxiliary is an alternator.

* * * * *